Patented Apr. 15, 1947

2,418,941

UNITED STATES PATENT OFFICE 2,418,941

THIOUREA DERIVATIVES OF POLYMERIC COMPOUNDS

Emmette F. Izard, Kenmore, N. Y., and Benjamin W. Howk, Wilmington, Del., assignors to E. I. du Pont de Nemours & Company, Wilmington, Del., a corporation of Delaware No Drawing. Application January 19, 1944, Serial No. 518,880

6 Claims. (Cl. 260—79)

This invention relates to polymeric materials, and more particularly to polymeric materials containing sulfur, and to the method of producing the same.

The term "polymeric material," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such substances as cellulose esters or ethers, the so-called addition polymers including such substances as polyvinyl alcohol and its derivatives, polyacrylic acids and their derivatives, and the so-called condensation polymers, including such substances as the polyesters and polyamides of polycarboxylic acids, synthetic resins and the like. Generally, polymeric materials of the type intended for use with this invention possess an average molecular weight in excess of 1000, and exist in the free state as solids at room temperature and atmospheric pressure.

It is an object of this invention to provide a new and useful polymeric material containing sulfur. Another object of this invention is to provide an isothiourea derivative of a polymeric material. A still further object of this invention is to provide a process of preparing the aforementioned polymeric derivatives, which process is easy of accomplishment and readily controlled. Other objects of the invention will appear hereafter.

The objects of this invention are, in general, accomplished by reacting thiourea with one or more active groups of a polymeric material. The resultant isothiourea derivative, depending on its exact constitution, is soluble in water, the common organic solvents, or mixtures thereof, and, upon treatment first with an alkaline agent to hydrolyze it and then with a mild oxidizing agent, is converted into a product that is insoluble in water and insoluble in common organic solvents and mixtures thereof. The hydrolysis converts the isothiourea derivative of the polymer to the mercaptan of said polymer.

The present invention will be more clearly understood by reference to the following detailed examples, it being understood, however, that these examples are illustrative and that the scope of the invention is not to be limited thereto. Throughout the examples, the parts of substances referred to are parts by weight unless otherwise indicated.

*Example I*

200 parts of p-toluene sulfonyl chloride dissolved in 440 parts of benzene were added with stirring to a solution of 100 parts of methyl cellulose (methoxy content of 18%) in 2000 parts of aqueous 4% sodium hydroxide, the temperature of the solution being maintained at approximately 0° C. Within a few minutes, 118 parts of methyl cellulose p-toluene sulfonate (methoxy content of 15.3%, p-toluene sulfonate content of 15%) were obtained as a precipitate.

20 parts of this insoluble material, having first been washed with water and dried, were then dissolved in a mixture of 92 parts of methyl Cellosolve (monomethyl ether of ethylene glycol) and 94 parts of dimethyl formamide. 10 parts of thiourea were added to this solution, and the mixture heated with stirring for 5 hours at 95° C. Sufficient water was then added to precipitate the material, the product being washed with water and dried. 7 parts of this material were dissolved in 93 parts of a 2:1 mixture of dimethyl formamide and methanol, the resulting viscous solution being cast onto a heated plate to form a thin transparent film. This film was then treated with aqueous 3% sodium hydroxide. Portions of the film, when tested with sodium nitroprusside solution, became violet-red in color, indicating the presence of free thiol groups. A second portion of the film was treated with a solution composed of 98 parts of alcohol and 2 parts of iodine, washed with water, and dried. The film showed no increase in brittleness but was completely insoluble in alkali, water and all organic solvents including mixtures of organic solvents, such as mixtures of methyl Cellosolve and dimethyl formamide. When tested with sodium nitroprusside solution, there was no indication of the presence of free thiol groups. Analysis indicated that it possessed numerous disulfide linkages. This was further borne out by the fact that treatment of the film with thioglycolic resulted in a film showing a positive test for free thiol groups.

*Example II*

A mixture of 88 parts of polyvinyl alcohol, 800 parts of methanol and 3.6 parts of sulfuric acid and 100 parts of chloracetone was heated to reflux with good stirring for 5 to 6 hours. The product was insoluble in water and methanol but was soluble in water-methanol mixtures. The product was removed from the reaction mixture by filtration and thoroughly washed with methanol. 228 parts of the methanol wet product (polyvinyl chlorketal) were added to a mixture of 242 parts of denatured alcohol and 200 parts of water, and stirred to produce a good solution. A portion of this solution was cast on a glass plate and dried at 110° C. The film so formed was soluble in a solvent composed of 60 parts of ethyl alcohol and 40 parts of water. 20 parts of thiourea were added to one-half of the original solution, and the mixture heated for 3 hours to bring about reaction. The resulting solution was cast on a glass plate to form a thin, transparent film. This film was dried in air until free of solvent. Analysis of the film indicated that it possessed the structure,

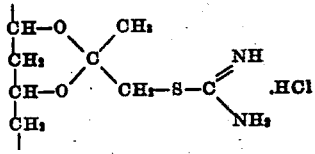

The film was then treated with an aqueous 30% sodium hydroxide. A portion of the resulting film, when tested with sodium nitroprusside solution, became violet-red in color, indicating the presence of free thiol groups. A second portion of the film was treated with a solution composed of 98 parts of alcohol and 2 parts of iodine, washed with water, and dried. The film showed no increase in brittleness, was swollen by water but not dissolved therein, and was insoluble in alkali and organic solvents, including mixtures of organic solvents such as mixtures of water and methanol. When treated with sodium nitroprusside solution, there was no indication of the presence of free thiol groups. Analysis indicated that it possessed numerous disulfide linkages and substantial absence of chlorine.

*Example III*

60 parts of polyvinyl chloracetate (prepared by the polymerization of vinyl chloracetate) were dissolved in 180 parts of methyl Cellosolve and the solution treated with 40 parts of thiourea at room temperature. The solution which became quite warm soon coagulated into a gelatinous mass, the excess solvent being decanted and the mass washed with methanol. The product obtained differed from the original polymeric material in that it was soluble in water. Analysis indicated that it possessed the structure,

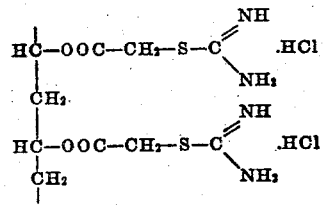

The product was treated with aqueous 3% sodium hydroxide and there resulted a compound containing free thiol groups, i. e. polyvinyl thioglycolate. After treating such product with a solution composed of 98 parts of alcohol and 2 parts of iodine, washing, and drying, there resulted a cross-linked product that was insoluble in water and common organic solvents, including methyl Cellosolve.

The above detailed examples illustrate embodiments of the present invention wherein thiourea is reacted with specific polymeric materials containing a specific reactive group, namely, methyl cellulose p-toluene sulfonate, polyvinyl chlorketal, and polyvinyl chloracetate. The present invention is not, however, to be so limited. In its broad scope, the present invention includes the treatment of any polymeric material containing any group which will react with thiourea to form an isothiourea derivative of the polymer.

As examples of other polymeric materials which may contain functional groups which are reactive with thiourea to produce an isothiourea derivative of the polymeric material, the following may be named: vinyl polymers, polyacrylic compounds, polymeric resins, cellulose derivatives, linear condensation polymers, for example, synthetic resins, synthetic linear condensation polyamides, polyesters, polyethers and polyanhydrides, and the like, provided only that the polymeric material contains, or can be made to contain, a reactive or functional group which is reactive with thiourea to produce an isothiourea derivative of the polymeric material.

As examples of reactive groups, which may be contained in the polymeric material to react with thiourea in accordance with the invention, the following may be named: any functional ester group taken from the class consisting of halogen esters, sulfate esters and sulfonate esters, for example, mono-, di- or trichloracetates, chlorketals, chloracetals, sulfates, alkyl or aryl sulfates, and alkyl, aralkyl or aryl sulfonates.

The isothiourea group may be attached directly to the polymeric chain or to the polymeric material through a linkage. In those cases wherein the isothiourea group is attached directly to the polymeric chain, the treatment of such polymeric derivative with alkali results in the formation of the thiol derivative of the polymeric material, which derivative may subsequently be rendered insoluble in and insensitive toward water and the common organic solvents by treatment with a mild oxidizing agent. When the isothiourea group is attached to the polymeric material through a linkage, the linkage must be one which is stable in the presence of alkali, otherwise conversion to the polymeric thiol derivative will not be obtained. Though an acetal or ketal linkage is preferred, in general any linkage which is stable at a pH of at least 9 to 10 may serve to attach the isothiourea group to the polymeric material to produce an isothiourea derivative thereof which, upon treatment with an alkali, will result in the formation of the thiol derivative of the polymeric material.

The degree of solubility of the isothiourea derivative and the degree of insolubility of the final oxidized product varies directly, of course, with the solubility characteristics of the original unreacted polymeric material and with the number of isothiourea groups inserted by the reaction of this invention. For example, in the case of a cellulose derivative of the type employed in Example I above, it is generally necessary to insert at least .05 mole of the thiol group, per glucose unit, to obtain upon subsequent treatment with an oxidizing agent a compound that is insoluble in water and the common organic solvents.

The polymeric thiol derivatives, obtained by treatment of the isothiourea derivative with alkali, are preferably rendered insoluble by treatment with a solution composed of 98 parts of alcohol and 2 parts of iodine. However, insolubilization can also be brought about by treatment with other mild oxidizing agents including air, peroxide, ferricyanides, dilute nitric acid, etc. Other suitable oxidizing agents include sodium hypochlorite, sodium hypoiodite, etc., and these substances, because of their alkaline nature, can, if desired, be employed directly with the polymeric isothiourea derivative of the invention, the agent serving to hydrolyze that derivative and simultaneously oxidize the product to form the desired disulfide linkage. The insoluble disulfide derivatives formed by such treatment can, as shown in Example I, be subsequently reconverted to the thiol compound and rendered soluble by treatment with a reducing agent such as thioglycolic acid.

As shown in the examples, the process of this invention makes possible the preparation of water- and organic solvent-insoluble and -insensitive shaped articles of sulfur-containing polymeric materials. The shaped article generally is prepared from the soluble isothiourea derivative obtained during the course of the process. However, this is not essential and the entire treatment, including modification of the polymer to insert a reactive group and subsequent treatment with thiourea and alkali and an oxidizing agent, can, if desired, be conducted on a pre-formed polymeric article. For example, a formed structure such as a sheet of regenerated cellulose can be surface-esterified with p-toluene sulfonyl chloride, the resulting ester then being treated in sheet form with thiourea to form the isothiourea salt which can subsequently be hydrolyzed with alkali and oxidized to form a water- and organic solvent-insoluble and -insensitive sheet.

This invention provides a simple and easily controlled process for the preparation of new polymeric materials comprising the isothiourea derivative of both naturally occurring and partly or wholly synthetic polymers. These isothiourea derivatives, most of which are suited for conversion into sulfur-containing polymeric materials that are insensitive to and insoluble in water and the common organic solvents, are, depending on their exact chemical composition, generally sensitive to and soluble in either water or the common organic solvents, or both, including mixtures of them. The invention thus provides a polymeric derivative that is capable of being dissolved in water and/or a common organic solvent to form a solution suited for use in the manufacture of a shaped article, which article can subsequently be transformed without change of shape into an article that is substantially completely insoluble in such solvents.

More importantly, by providing such an isothiourea derivative, the invention makes possible a simple, direct method for the transformation of a polymeric material into a sulfur-containing substance that is insoluble in and insensitive toward water and organic solvents. The process does not give rise to the formation of undesirable by-products, the polymeric material finally obtained being substantially free of such substances and possessing a light color.

Since it is obvious that many changes and modifications can be made in the above-described details without departing from the nature and spirit of the invention, it is to be understood that the invention is not to be limited to the details described herein except as set forth in the appended claims.

We claim:

1. The isothiourea derivative of a macromolecular organic compound having at least one recurring unit linked together in chain-like fashion in the molecule, an average molecular weight in excess of 1000, and at least one reactive ester group selected from the class consisting of halogen esters, sulfate esters and sulfonate esters and in which derivative the isothiourea group is attached through the sulfur atom to the chain of the macromolecular organic compound.

2. The isothiourea derivative of a macromolecular organic compound having at least one recurring unit linked together in chain-like fashion in the molecule, an average molecular weight in excess of 1000, and at least one reactive ester group selected from the class consisting of halogen esters, sulfate esters and sulfonate esters and in which derivative the isothiourea group is attached directly through the sulfur atom to the chain of the macromolecular organic compound.

3. The isothiourea derivative of a macromolecular organic compound having at least one recurring unit linked together in chain-like fashion in the molecule, an average molecular weight in excess of 1000, and at least one reactive ester group selected from the class consisting of halogen esters, sulfate esters and sulfonate esters and in which derivative the isothiourea group is attached through the sulfur atom to a linkage which is attached to the chain of the macromolecular organic compound, said linkage being stable at a pH of at least 9 to 10.

4. The thiourea derivative of methyl cellulose p-toluene sulfonate.

5. The thiourea derivative of polyvinyl chlorketal.

6. The thiourea derivative of polyvinyl chloracetate.

EMMETTE F. IZARD.
BENJAMIN W. HOWK.

REFERENCES CITED

The following references are of record in the file of this patent:

UNITED STATES PATENTS

| Number | Name | Date |
|---|---|---|
| 2,338,177 | Graenacker et al. | Jan. 4, 1944 |
| 2,302,885 | Orthner | Nov. 24, 1942 |
| 1,771,461 | Lilienfeld | July 29, 1930 |

FOREIGN PATENTS

| Number | Country | Date |
|---|---|---|
| 506,962 | German | Sept. 10, 1930 |